(12) United States Patent
Mariller

(10) Patent No.: US 9,833,107 B2
(45) Date of Patent: Dec. 5, 2017

(54) CAPSULE FOR PREPARING A BEVERAGE, AND MATCHING CAPSULE HOLDER

(75) Inventor: Alain Mariller, Le Mont-Pèlerin (CH)

(73) Assignee: ETHICAL COFFEE COMPANY SA, Fribourg (CH)

(*) Notice: Subject to any disclaimer, the term of this patent is extended or adjusted under 35 U.S.C. 154(b) by 905 days.

(21) Appl. No.: 14/004,019

(22) PCT Filed: Mar. 7, 2012

(86) PCT No.: PCT/IB2012/051067
§ 371 (c)(1),
(2), (4) Date: Sep. 9, 2013

(87) PCT Pub. No.: WO2012/120459
PCT Pub. Date: Sep. 13, 2012

(65) Prior Publication Data
US 2013/0341478 A1 Dec. 26, 2013

(30) Foreign Application Priority Data
Mar. 7, 2011 (WO) .................. PCT/IB2011/050953

(51) Int. Cl.
| A47J 31/00 | (2006.01) |
| A47J 31/44 | (2006.01) |
| A47J 31/36 | (2006.01) |
| B65D 85/804 | (2006.01) |
| A47J 31/40 | (2006.01) |

(52) U.S. Cl.
CPC ....... *A47J 31/4403* (2013.01); *A47J 31/3623* (2013.01); *A47J 31/407* (2013.01); *B65D 85/8043* (2013.01)

(58) Field of Classification Search
CPC .. A47J 31/3623; A47J 31/4403; A47J 31/407; B65D 85/8043
USPC ................ 99/295, 323; 248/346.03; 426/112
See application file for complete search history.

(56) References Cited

U.S. PATENT DOCUMENTS

| 8,535,743 B2 | 9/2013 | Kamerbeek et al. |
| 2006/0110507 A1 | 5/2006 | Yoakim et al. |
| 2007/0224319 A1 | 9/2007 | Yoakim et al. |

(Continued)

FOREIGN PATENT DOCUMENTS

| DE | 10 2008 014758 | 10/2009 |
| EP | 1 654 966 | 5/2006 |

(Continued)

OTHER PUBLICATIONS

International Search Report for PCT/IB2012/051067 dated Jul. 11, 2012.

(Continued)

*Primary Examiner* — Reginald L Alexander
(74) *Attorney, Agent, or Firm* — Nixon & Vanderhye P.C.

(57) ABSTRACT

A capsule for preparing a beverage, for example coffee, includes a hollow element for containing a product from which the beverage is made, for example ground coffee. The hollow element is provided with a side wall, a top surface, a bottom surface and a flange. The flange includes a deformable element which is deformed by a deforming member arranged on the capsule holder. A device for using the capsule and a method for extracting a beverage are also provided.

14 Claims, 1 Drawing Sheet

(56) References Cited

U.S. PATENT DOCUMENTS

| | | | |
|---|---|---|---|
| 2009/0205505 A1* | 8/2009 | Russo | A47J 31/36 99/295 |
| 2009/0223373 A1 | 9/2009 | Kollep et al. | |
| 2009/0280219 A1 | 11/2009 | Yoakim et al. | |
| 2009/0320692 A1 | 12/2009 | Simanski | |
| 2011/0259204 A1 | 10/2011 | Kaeser et al. | |

FOREIGN PATENT DOCUMENTS

| | | |
|---|---|---|
| EP | 1 849 715 | 10/2007 |
| EP | 2 151 313 | 2/2010 |
| EP | 2 284 100 | 2/2011 |
| WO | WO 2007/137974 | 12/2007 |

OTHER PUBLICATIONS

Written Opinion of the International Searching Authority dated Jul. 11, 2012.
The First Office Action, CN Appln. No. 201280011257.6, dated Sep. 22, 2014.
International Preliminary Report on Patentability(IPRP Chapter 1) and English Translation of Written Opinion for PCT/IB2012/051067, dated Sep. 10, 2013.

\* cited by examiner

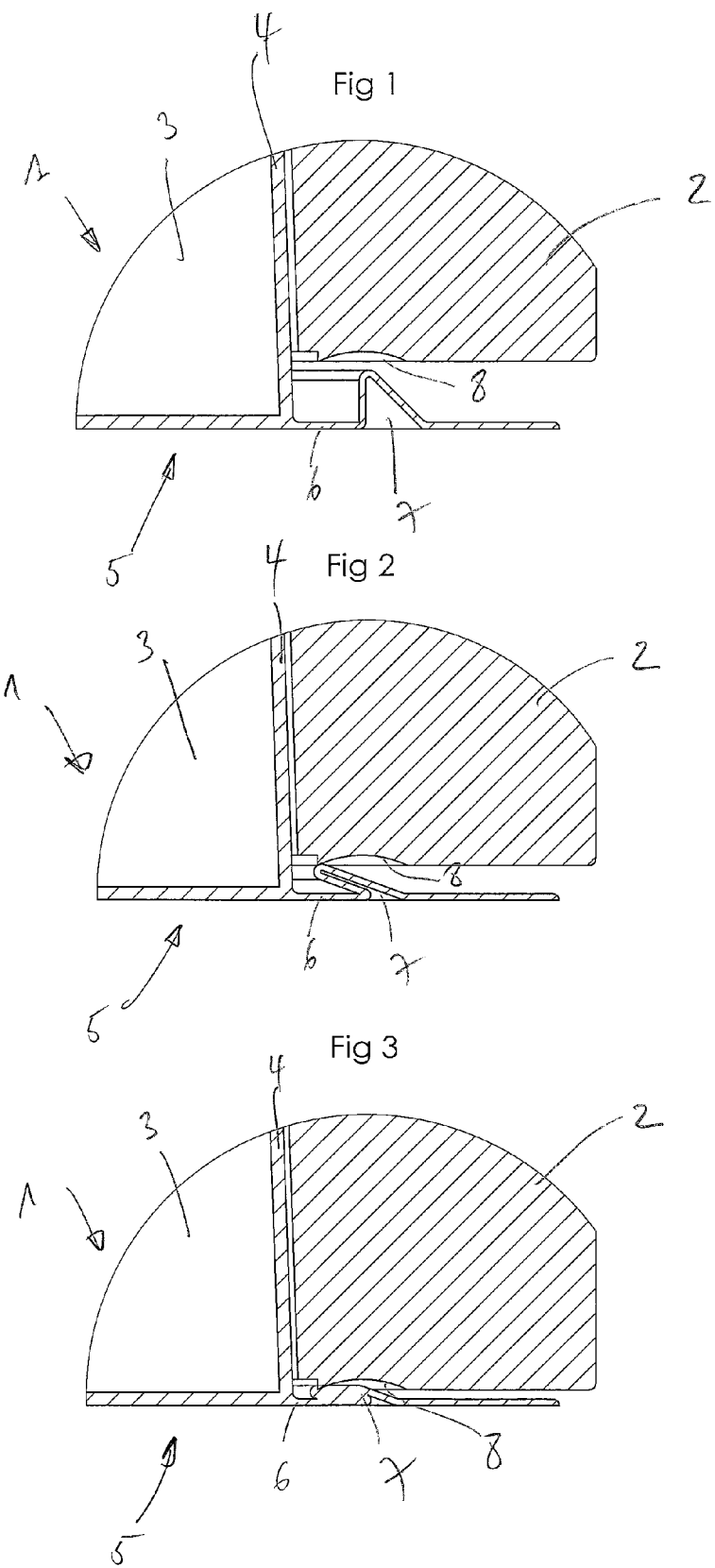

CAPSULE FOR PREPARING A BEVERAGE, AND MATCHING CAPSULE HOLDER

This application is the U.S. national phase of International Application No. PCT/IB2012/051067 filed 7 Mar. 2012 which designated the U.S. and claims priority to PCT/IB2011/050953 filed 7 Mar. 2011, the entire contents of each of which are hereby incorporated by reference.

FIELD

The present invention falls within the field of the preparation of beverages, for example coffee-based, by extraction of a concentrated dose, for example of ground coffee, contained in a capsule. It relates more particularly to the doses used for this purpose and also to the devices using such doses.

BACKGROUND AND SUMMARY

Capsules and machines functioning according to the above-mentioned principle have existed for several decades.

The U.S. Pat. No. 2,899,886, U.S. Pat. No. 2,968,560, U.S. Pat. No. 3,403,617 and U.S. Pat. No. 3,607,297 describe devices in which the capsule is initially perforated in several places, then passed through by water under pressure.

The capsule described in the patent CH 605 293 or in the patent EP 0 242 556 B1 comprises a membrane in its lower part. Water under pressure is initially introduced in the upper part of the capsule, which brings about a swelling of the capsule, principally at the level of the membrane. Starting from a certain pressure, the membrane tears, thus permitting the flow of a water-coffee mixture.

Other capsules provided with a membrane are described in the following patent documents: EP 0 468 079 A, EP 0 806 373 A, EP 0 554 469 A.

One of the objectives of the present invention lies in an improvement of the circulation of the liquid through the capsule, and the invention aims to prevent liquid from flowing along the side wall of the capsule and also aims to optimize the "capsule-capsule holder" pair by proposing specific means cooperating with one another to obtain an optimized function.

These objectives are realized with the capsule and the device as defined in the claims.

According to the present invention, to respond, in particular, to the problems of tightness of the existing capsules, there is provided as a minimum, on a portion of the capsule, for example on the flange thereof, deformable element which cooperates with a corresponding deforming member placed on the capsule holder (or on a fixed element or a portion of the said capsule holder).

Typically, the deformable element can be a deformable collar on the flange of the capsule. This collar can be formed in the said flange or can be added thereon. Preferably, this collar (the deformable element) undergoes a plastic deformation during the use of the capsule. Alternatively, an elastic deformation could be envisaged.

In a corresponding manner, the deforming member of the capsule holder can be a groove formed in the lower edge of the said capsule holder, the said groove permitting the collar to be deformed in a directed manner. This groove can be of any shape, but preferably it is such that it promotes a directed deformation of the deformable element of the capsule. Preferably, this groove has a rounded shape.

Furthermore, additional means can be provided (for example a specific material or a shape) on the capsule holder (in particular on the deforming member), the resistance of which is adapted to that of the deformable element of the capsule, for example to that of the collar, such that only deformable elements having a maximum predetermined resistance are correctly deformed by the capsule holder. According to this principle, the use of a capsule of which the collar would have a resistance greater than that which is predetermined would result in a temporary or permanent deformation of the capsule holder (namely in particular of the deforming member), or the part carrying the deforming member. This would permit the prevention of the use of capsules non-adapted to the capsule holder (and to the machine) concerned, by adversely affecting in particular the tightness.

An effect of the present invention is that it permits an "optimization" of the capsule-capsule holder pair in that the means which are provided are provided in a manner which optimizes the functioning of the machine, since an optimum pair is obtained of the elements constituting the system and the deformation of the deformable means reinforces the tightness of the system.

Several equivalent ways of forming the means according to the invention are possible and the example embodiments in the present application are given by way of illustration. Of course, they must not be considered as being restrictive, and variations are possible within the framework of the present application, in particular by the use of equivalent means.

BRIEF DESCRIPTION OF THE DRAWINGS

The invention is described in further detail below by means of examples illustrated by the following figures:

FIG. 1 presents a partial section of an embodiment of a device and of a capsule according to the invention in a first position.

FIG. 2 presents a partial section of an embodiment of a device and of a capsule according to the invention in a second position.

FIG. 3 presents a partial section of an embodiment of a device and of a capsule according to the invention in a third position.

DETAILED DESCRIPTION

As illustrated in FIG. 1 (and in a known manner in the field of coffee capsules for example), a capsule 1 containing a product 3 (for example ground coffee) is introduced in a capsule holder 2. The capsule includes in particular a body of generally cylindrical shape 4 and a bottom 5 with a membrane (not illustrated) through which liquid, introduced under pressure, exits when it has passed through the product 3.

The capsule 4 includes in particular a flange 6 on which the deformable element 7 are provided. In the non-restrictive example of the figures, the deformable element includes a collar formed by the flange 6. Alternatively, this collar can be added on the flange 6. In section, the collar has a generally triangular illustrated shape, but this representation is not restrictive and other equivalent shapes are possible.

Preferably, the shape chosen for the deformable element induces a directed deformation of the deformable element. This induced deformation can be intrinsic or it can be aided and/or caused by the deforming member 8 of the capsule holder 2. The deforming member 8 is, for example (as illustrated), a groove formed in the lower part of the capsule holder which comes in contact with the flange of the capsule.

The groove forming the deforming member 8 can have a rounded bottom (as illustrated), or not. Preferably, the shape of the groove (and, by extension, of the deforming member 8) cooperates with the deformable element 7 so as to cause a directed deformation of the same deformable element 7.

The deforming member 8 can be directly formed in the capsule holder 2, or it can be formed in an added piece which is mounted on the capsule holder 2. Alternatively, the deforming member 8 can also be partially formed in the capsule holder 2 and in an added element.

The deforming member 8 can also have specific deformation characteristics adapted to the deformable element such that only the deforming member 8 is capable of deforming the deformable element 7, for example that the deforming member 8 is only capable of exerting a certain deformation force limited to a predetermined value, beyond which the deforming member 8 itself undergoes a deformation (plastic, for example). Thus, only the capsules of which the deforming means deform below a certain value are able to be used with a given capsule holder and a use of non-matching capsules can be prevented.

Preferably, the deformable element 7 is present on the entire periphery of the capsule and, in a corresponding manner, the deforming members 8 is also present on the entire periphery of the capsule holder 2. Alternatively, the deformable element 7 and deforming member 8 are not present on the whole of the periphery of the capsule, respectively of the capsule holder.

As illustrated in the FIGS. 1-3, a capsule 1 is introduced in a capsule holder 2, the deformable element 7 and deforming member 8 being generally facing one another. In FIG. 2, the capsule holder 2 is lowered and by its movement deforms the deformable element 7 by the deforming member 8.

As is observed, the deformation of the deformable element 7 occurs in a directed manner towards the interior, with the material forming the deformable element 7 forming a fold.

FIG. 3 illustrates the final position of the capsule holder for the extraction of the beverage: the deformable element 7 is entirely "flattened", thus forming a seal.

FIGS. 1 to 3 show a device, the functioning of which is carried out along a vertical axis (movement of the capsule holder), but it is well understood that this movement and the alignment can be situated along another axis, for example horizontal or other (inclined, for example), the principle of the invention remaining the same.

The invention claimed is:

1. A capsule adapted to being held by a capsule holder for preparing a beverage, wherein the capsule includes a hollow element for containing a product from which the beverage is prepared, and wherein the hollow element comprises:
   a side wall,
   a top surface,
   a bottom surface, and
   a planar flange having a deformable element which includes a protrusion, wherein
   the deformable element is configured to be directionally folded relative to the side wall of the hollow element in response to contact with a deforming member of the capsule holder and cause the deformable element to be flattened into a coplanar relationship with the flange thereby forming a seal between the flattened deformable element and the capsule holder.

2. The capsule according to claim 1, wherein the protrusion of the deformable element includes a collar surrounding the side wall of the capsule.

3. The capsule according to claim 1, wherein the protrusion of the deformable element is positioned around an entire periphery of the side wall of the capsule.

4. The capsule according to claim 1, wherein the protrusion of the deformable element is integrally formed in the flange, formed on the flange and/or is added as a separate element onto the flange.

5. The capsule according to claim 1, wherein the deformable element deforms in a direction towards the side wall of the capsule is induced by the shape of the protrusion of the deformable element.

6. The capsule according to claim 1, wherein the protrusion of the deformable element is situated on a part of the periphery of the capsule.

7. The capsule according to claim 1, wherein the deformable element comprises an angular protrusion.

8. A device for forming a beverage comprising:
   a capsule includes a hollow element for containing a product from which the beverage is prepared; and
   a capsule holder for holding the capsule, wherein
   the capsule comprises a side wall, a top surface, a bottom surface and a planar flange having a deformable element which includes a protrusion, and wherein
   the capsule holder includes a deforming member which is configured to contact the protrusion of the deformable element of the capsule to thereby fold the protrusion into a flattened coplanar relationship with the flange to thereby form a seal between the deformable element and the capsule holder, wherein
   the device allows for introduction of a liquid into the hollow element so as to contact the product therein and allow extraction of the beverage therefrom.

9. The device according to claim 8, wherein the deforming member includes a groove.

10. The device according to claim 8, wherein the deforming member is formed in the capsule holder and/or is added as a separate element on the capsule holder.

11. The device according to claim 8, wherein the deforming member is situated on an entire periphery of the capsule holder.

12. The device according to claim 8, wherein the deforming member is capable of imparting a predetermined deformation force before the deforming member is deformed.

13. The capsule holder according to claim 8, wherein the deforming member is situated on a part of the periphery of the capsule holder.

14. A method for using the device according to claim 8, wherein the method comprises:
   (i) introducing the capsule into the capsule holder, and thereafter
   (ii) closing the capsule holder to responsively cause the deforming member of the capsule holder to contact the deformable element of the capsule to thereby cause the deformable element to be folded and flatted into the coplanar relationship with the flange.

* * * * *